United States Patent

Gowda

[11] Patent Number: 5,857,753
[45] Date of Patent: Jan. 12, 1999

[54] SUBMERSIBLE COVER FOR A LOW PRESSURE ACCUMULATOR

[75] Inventor: Padmanab Lakshman Gowda, Troy, Mich.

[73] Assignee: ITT Automotive Inc., Auburn Hills, Mich.

[21] Appl. No.: 710,593

[22] Filed: Sep. 20, 1996

[51] Int. Cl.$^6$ ..................................................... B60T 8/40
[52] U.S. Cl. ............................ 303/116.4; 303/DIG. 11; 138/31
[58] Field of Search ................... 138/30, 31; 303/116.1, 303/116.2, 116.4, DIG. 11, 84.1, 87

[56] References Cited

U.S. PATENT DOCUMENTS

| | | | |
|---|---|---|---|
| 5,039,176 | 8/1991 | Hellman et al. | 303/116.1 |
| 5,094,599 | 3/1992 | Budecker . | |
| 5,172,956 | 12/1992 | Klose et al. . | |
| 5,311,910 | 5/1994 | Hasegawa et al. | 138/31 |
| 5,354,187 | 10/1994 | Holland et al. | 138/31 X |
| 5,365,736 | 11/1994 | Yamamoto . | |
| 5,390,989 | 2/1995 | Kim . | |
| 5,401,086 | 3/1995 | Nishikimi et al. . | |
| 5,425,573 | 6/1995 | Mirlocca . | |
| 5,460,438 | 10/1995 | Hellmann et al. . | |

*Primary Examiner*—Lee W. Young
*Attorney, Agent, or Firm*—J. Gordon Lewis; Thomas N. Twomey

[57] ABSTRACT

An accumulator for an anti-lock brake system includes a valve body portion defining an accumulator chamber, an accumulator piston slidably disposed within the accumulator chamber, a spring, and a cover. The accumulator chamber has a fluid inlet for connection to a source of pressurized fluid at a first end of the chamber. The chamber has a second end open to atmosphere. The accumulator piston separates the first end of the chamber from the second end of the chamber. The spring is disposed in the accumulator chamber between the piston and the second end of the chamber and biases the piston toward a first position. The cover closes the second end of the chamber and atmosphere and has microporous structure. The micro-porous structure is configured to block water molecules and to pass constituent molecules of air, thereby enabling air to be communicated across while preventing the intrusion of water into the chamber through the second end.

16 Claims, 3 Drawing Sheets

SUBMERSIBLE COVER FOR A LOW PRESSURE ACCUMULATOR

FIELD OF THE INVENTION

This invention relates to filtering covers and more particularly to filtering covers suited for use with low pressure accumulators in motor vehicle anti-lock brake systems.

BACKGROUND OF THE INVENTION

Low pressure accumulators are commonly used in anti-lock brake systems to accommodate a volume of fluid released by a wheel brake apply piston during anti-lock brake actuation when a fluid pump is not pumping fluid. A piston within the low pressure accumulator is displaced with relative ease by the pressurized fluid from the brake piston, enabling release of the brake. When it is displaced by pressurized fluid, the piston compresses the accumulator spring and displaces air from a spring side of the accumulator chamber. When the pump is cycled on, fluid is drawn from the low pressure accumulator, allowing the piston to return to its original position. The piston is biased to a zero volume position by an accumulator spring. Air is drawn back into the spring side of the accumulator chamber.

The spring side of the chamber is commonly vented by providing a cover over an end of the accumulator spring chamber which has a one way lip seal around a periphery of the cover which seals against an inner wall of the accumulator chamber. The one way lip seal deflects to enable air to flow past it and out of the chamber when pressure inside the chamber exceeds atmospheric pressure, but seals against the chamber wall to prevent air or any other fluid from entering when pressure inside the chamber is less than atmospheric pressure. One potential side effect of the inability of the lip seal to allow air to return to the spring chamber is that it will slow or prevent the return of the piston when the pressurizing pump is activated. If the piston cannot return to a zero volume position, its capacity may be compromised to the point that it may not be possible to achieve a full release of the wheel brake during anti-lock brake cycling actuation. However, if air can re-enter the chamber without any type of restriction, then water and other contaminants may induce corrosion and interfere with the movement of the piston. Such interference would also result in a compromising of the capacity of the accumulator. It is therefore necessary that any means for enabling the return of air to the accumulator chamber prevent the entry of water and other contaminants which can cause the piston to corrode and/or stick in the accumulator chamber.

It is desired to provide a cover for a low pressure accumulator which allows air to move in and out of the accumulator chamber freely while blocking water and other contaminants from entering the accumulator chamber.

SUMMARY OF THE INVENTION

An accumulator for an anti-lock brake system includes a valve body portion defining an accumulator chamber, an accumulator piston slidably disposed within the accumulator chamber, a spring, and a cover. The accumulator chamber has a fluid inlet for connection to a source of pressurized fluid at a first end of the chamber. The chamber has a second end open to atmosphere. The accumulator piston separates the first end of the chamber from the second end of the chamber. The spring is disposed in the accumulator chamber between the piston and the second end of the chamber and biases the piston toward a first position. The cover closes the second end of the chamber and atmosphere and has microporous structure. The micro-porous structure is configured to block water molecules and to pass constituent molecules of air, thereby enabling air to be communicated across while preventing the intrusion of water into the chamber through the second end.

A cover for a low pressure accumulator is disclosed which provides adequate pressure equalization for a spring side of a low pressure accumulator chamber while preventing the entry of water and other contaminants into the spring side of the chamber to prevent corrosion and dirt therein.

DETAILED DESCRIPTION OF THE PREFERRED EMBODIMENTS

Figure 1:
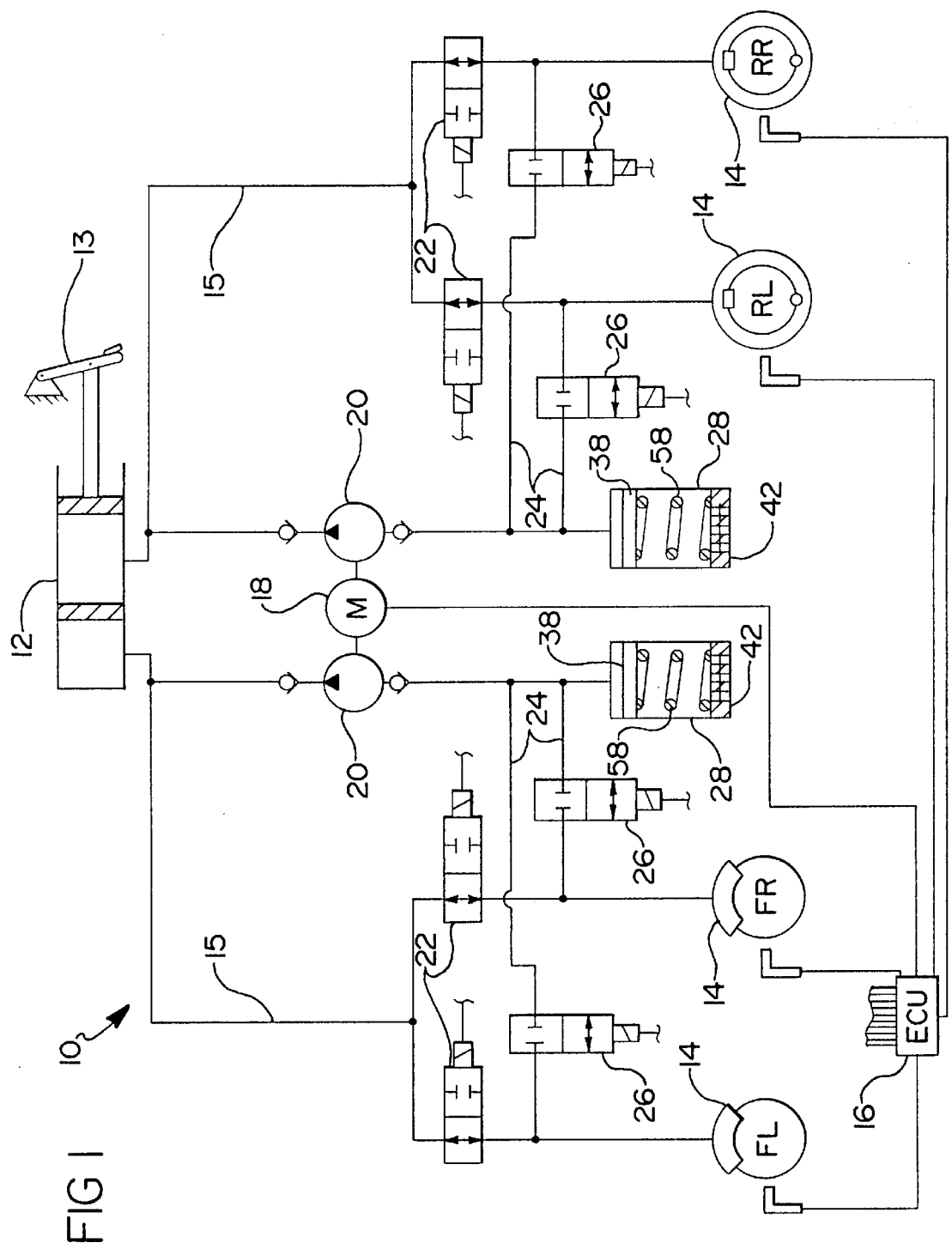
FIG. 1 is a schematic diagram of an anti-lock brake system employing two low pressure accumulators.

An anti-lock brake system 10 as shown in FIG. 1 includes a master cylinder 12 selectively pressurized by an operator actuating a brake pedal 13 to apply wheel brakes 14. Pressure lines 15 connect master cylinder 12 with wheel brakes 14. An electronic control unit 16 is electrically connected to an electric motor 18 which is drivingly connected to hydraulic pumps 20. Electric motor 18 operates responsive to signals from electronic control unit 16 to drive pumps 20 in a manner well known within the art of anti-lock braking systems. Solenoid operated inlet valves 22 are disposed in pressure lines 15 between master cylinder 12 and each of the wheel brakes 14. The relief valves 26 are electrically connected to electronic control unit 16 and operably block the transmission of pressure from master cylinder 12 to the wheel brakes responsive to electrical signals from electronic control unit 16. Relief lines 24 are disposed between the wheel brakes and an inlet port of the hydraulic pumps 20.

Solenoid operated relief valves 26 are electrically connected to the electronic control unit 16 and are disposed in each of the relief lines 24. The relief valves 26 block flow from the wheel brake 14 to the hydraulic pump 20 when they are in a closed position. The relief valves 26 operably open responsive to an electrical signal from the electronic control unit 16. Opening of a solenoid operated relief valve 26 enables a dumping of brake fluid from the associated wheel brake 14 to accumulator 28, eliminating the apply pressure in that brake.

Low pressure fluid accumulators 28 are fluidly connected to relief lines 24 between solenoid operated relief valves 26 and hydraulic pumps 20.

Figure 2:
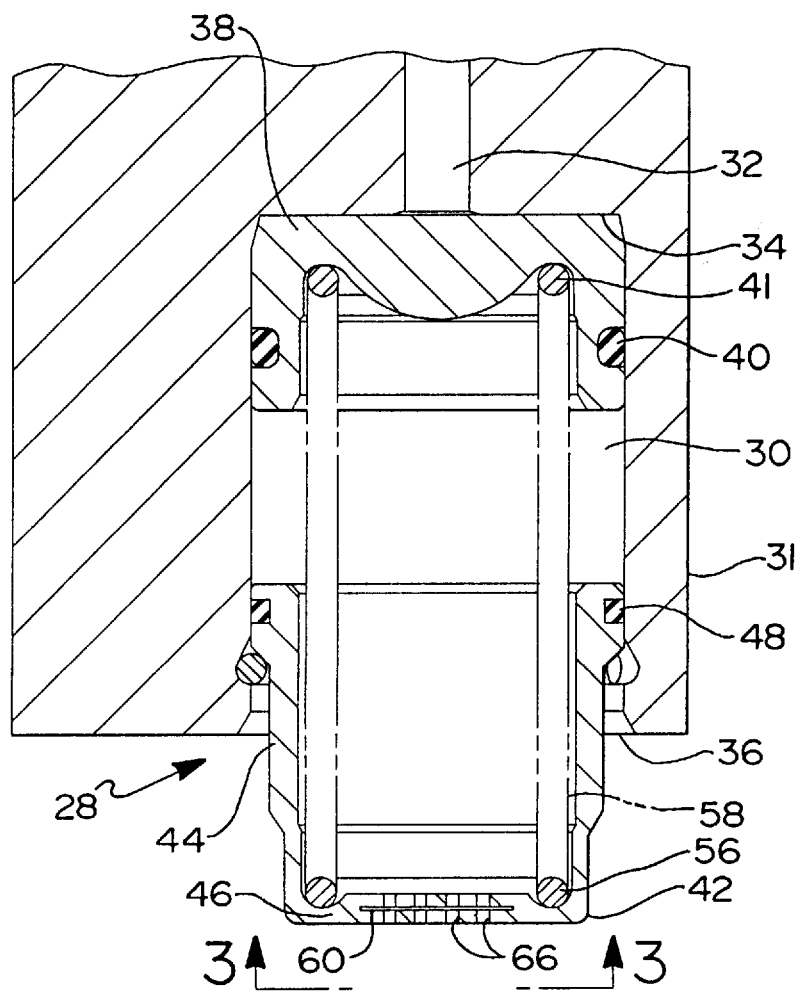
FIG. 2 is a sectional view of a low pressure accumulator with a cover.

As best shown in FIG. 2, a first embodiment of each of accumulators 28 has an accumulator chamber 30 formed within a valve body portion 31. A fluid inlet 32 is disposed at a first or closed end 34 of chamber 30. A second or open end 36 open to atmosphere is disposed at an end of chamber 30 opposite first end 34.

An accumulator piston 38 is slidably disposed within accumulator chamber 30 and separates first end 34 from second end 36. Piston 38 includes an annular piston seal 40 circumscribing an outer circumference retaining the hydraulic fluid on a side of piston 38 facing first end 32. Piston 38 has a spring seat 41 disposed on a back side opposite the hydraulic fluid.

An accumulator cover 42 is disposed at second end 36 and extends there past. A skirt portion 44 extends from inside chamber 30 outward to an end portion 46 which defines a closure of cover 42. An annular cover seal 48 is molded into a groove circumscribing skirt portion 44 at a location disposed within chamber 30. Seal 48 blocks flow both into and out of chamber 30, as distinguished from the known lip seal which blocks flow in only a single direction. A snap ring 50 disposed in a snap ring groove 52 formed in a wall of chamber 30 and engaging a snap ring engagement surface 54 of cover 42 retains cover 42 within chamber 30. An inner side of the end portion 46 defines a spring seat 56. A low pressure accumulator spring 58 is disposed between spring seat 41 and spring seat 56 biasing piston 38 to a first or minimum volume position.

Accumulator cover 42 is formed of polyphthalamide, a rigid thermoplastic, and is filled with 40% carbon fiber reinforcement.

A semi-permeable membrane formed of polytetraflouroethylene (PTFE) is micro porous with its structure configured so as to prevent water molecules from passing therethrough, yet enabling the constituent molecules of air to pass therethrough. Such a membrane is commercially available from W. L. Gore and Associates. The membrane is resistant to brake fluid and can withstand water pressure up to 40 psi. The membrane is thermally stable in brake systems operating in a temperature range of −40° F. to 125° F.

Figure 4:
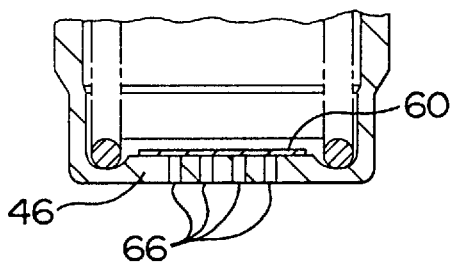
FIG. 4 is a sectional view of a broken out portion of a cover with an alternative means of attaching a semi-permeable membrane.
Figure 3:
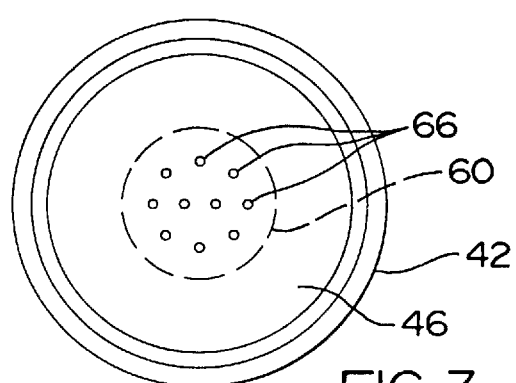
FIG. 3 is an end view of a cover for a low pressure accumulator in the direction of arrow 3 of FIG. 2.

Membrane 60 is sandwiched or trapped between an inner supporting portion 62 and an outer supporting portion 64 which have ten aligned apertures defining a supporting grid on both sides of the membrane. Cover 42 is preferably molded over membrane 60. However, alternative methods of fixing membrane 60 to cover 42 are possible, such as placing membrane 60 against an inside of end portion 46 and heat staking membrane 60 in place in an annular fashion, fusing the membrane and the cover together, to completely seal membrane 60 against cover 42, as shown in FIG. 4.

The inventive accumulator and accumulator cover operate in the following manner. During anti-lock brake actuation of a wheel brake 14, the associated inlet valve 22 is moved to a closed position responsive to a signal from electronic control unit 16, thereby blocking the transmission of pressure from master cylinder 12 and hydraulic pump 20 to a wheel brake of a wheel about to experience lockup. Essentially simultaneous with the closure of valve 22, relief valve 26 is displaced to an open position by electronic control unit 16, enabling the affected wheel brake 14 to exhaust a sufficient quantity of fluid to relieve the apply pressure. The quantity of fluid displaced along the relief line 24 is taken up by low pressure accumulator 28 when pump 20 is not taking fluid in. Without low pressure accumulator 28, there is no relief of the brake apply pressure within the brake when pump 20 is not operating.

Fluid enters accumulator chamber 30 through inlet 32, axially displacing piston 38 from second end 34, overcoming spring 58. As piston 38 is displaced, a volume of air behind piston 38 is exhausted through aligned apertures 66 past membrane 60. Little resistance to the air passing therethrough is offered by membrane 60.

When pump 20 begins operating, it rapidly reduces the pressure in inlet 32 and draws off the volume stored in accumulator 28 as piston 38 is returned to first end 34 by spring 58. Restriction of the return of air into chamber 30 would slow and potentially prevent the return of piston 38 to second end 36 because of the vacuum which would develop in chamber 30. However, semi-permeable membrane 60 enables air to flow freely therethrough, allowing piston 38 to quickly return to first end 34. Membrane 60, however, effectively blocks water and other contaminants from entering chamber 36, even when the exposed side of cover 42 is completely submerged under water, thereby preventing contamination and corrosion of chamber 30.

Figure 5:
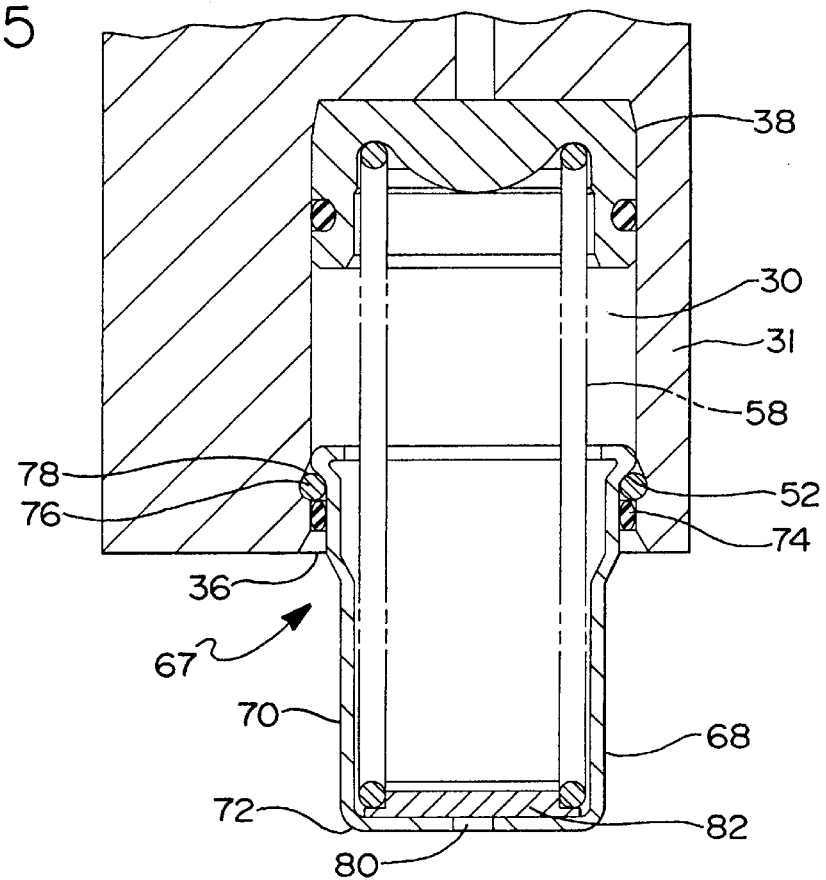
FIG. 5 is a sectional view of an alternative embodiment of a cover.
Figure 6:
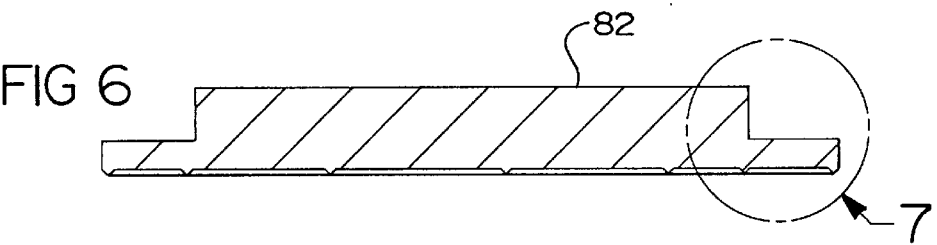
FIG. 6 is an enlarged view of a filtering element of the cover of FIG. 5.
Figure 7:
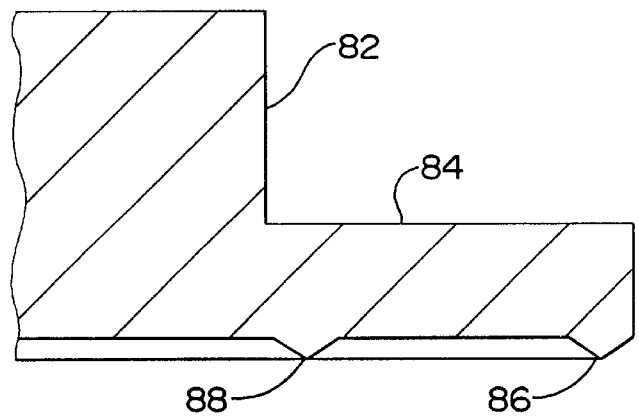
FIG. 7 is an enlarged, broken out view of a portion of FIG. 6 in circle 7.

An alternative embodiment of an accumulator 67 is shown in FIGS. 5–7. Accumulator 67 has a slightly different structure than accumulator 28, but operates in the same manner. An accumulator cover 68 is disposed in chamber 30. Cover 68 is stamped from sheet metal, preferably steel. A skirt portion 70 extends from inside chamber 30 outward to an end portion 72 which defines a closure of cover 68. An annular cover seal 74 is disposed between skirt portion 70 and a wall of chamber 30 proximate to second end 36. A snap ring 76 is disposed in a snap ring groove 52 and engages a snap ring engagement surface 78 of cover 68 to retain cover 68 within chamber 30. The end portion 72 of cover 68 has a breathing aperture 80 at its center for the passage of air into and out of chamber 30.

A rigid semi-permeable disc 82 is disposed inside cover 68 at end portion 72 over aperture 80. Disc 82 is formed of specially processed polytetraflouroethelyne which makes it an open celled structure having a microstructure configured to block water molecules, yet communicating the constituent molecules of air. This material is commercially available from a company by the name of Performance Plastics Products, Inc. of Houston, Tex. under the trademark "Permilon". Because the disc 82 is relatively thick and rigid compared to membrane 60, it resists communicating water molecules even at pressures above 40 psi, and will even resist pressurized water from car wash sprays.

Disc 82 has a spring seat 84, with spring 58 being disposed directly thereagainst. Disc has a first or outer annular seal 86 with a profile in the shape of an axially extending triangle, and a second or inner annular seal 88 with an identical profile. Both seals 86 and 88 engage an inner side of end cover 72 under the force of spring 58 to prevent water or other contaminants from traveling around disc 82 to enter chamber 30.

Other aspects, objects and advantages of this invention can be obtained from a study of the drawings, the disclosure and the appended claims.

I claim:

1. An accumulator for an anti-lock brake system comprising:

a valve body portion defining an accumulator chamber having a fluid inlet for connection to a source of pressurized fluid at a first end of the chamber and the chamber having a second end open to atmosphere;

an accumulator piston slidably disposed within the accumulator chamber and separating the first end of the chamber from the second end of the chamber;

a spring disposed between the piston and the second end of the chamber biasing the piston toward a first position;

a cover closing the second end of the chamber and having a semi-permeable structure with the structure being configured to block water molecules and pass constituent molecules of air thereby enabling air to be communicated across the structure while preventing the intrusion of water into the chamber through the second end.

2. An accumulator as claimed in claim 1 wherein the semi-permeable structure is a micro-porous membrane.

3. An accumulator as claimed in claim 1 wherein the cover defines the second end of the chamber and the spring is disposed thereagainst.

4. An accumulator as claimed in claim 2 wherein the cover has a plurality of apertures defining a grid reinforcing the membrane.

5. An accumulator as claimed in claim 4 wherein the membrane is retained against an inside of the cover within the chamber by heat staking it in place, thereby fusing the membrane and the cover.

6. An accumulator as claimed in claim 4 wherein the membrane is sandwiched within the cover between rigid inner and outer supporting portions of the cover defining a plurality of aligned apertures.

7. An accumulator as claimed in claim 2 wherein the membrane is formed from polytetraflouroethylene.

8. An accumulator as claimed in claim 1 wherein the semi-permeable structure is a disc formed of an open cell thermoplastic material.

9. An anti-lock brake system comprising:

an electronic controller;

a wheel brake;

a hydraulic pump operated by an electrical motor electrical motor with the electrical motor being electrically connected to the electronic controller;

a relief line disposed between and fluidly connecting the wheel brake and an inlet port of the hydraulic pump;

a solenoid operated relief valve electrically connected to the electronic controller and disposed in the relief line and the relief valve blocking flow from the wheel brake to the hydraulic pump when in a closed position and the valve operably opening responsive to an electrical signal from the electronic controller thereby enabling a dumping of brake fluid from the brake; and a fluid accumulator receiving hydraulic fluid from the brake when the relief valve is open and the hydraulic pump is not displacing fluid, the accumulator including a valve body portion defining an accumulator chamber having a fluid inlet at a first end of the chamber in fluid communication with the relief line and the chamber being open to atmosphere at a second end of the chamber, an accumulator piston slidably disposed within the accumulator chamber separating the first end of the chamber from the second end of the chamber and having hydraulic fluid disposed on a side facing the first end, a spring disposed between the piston and the second end of the chamber biasing the piston toward the first end, and a cover closing the second end of the chamber and having a semi-permeable structure configured to block water molecules and communicate air.

10. An anti-lock brake system as claimed in claim 9 wherein the semi-permeable structure is a micro-porous membrane.

11. An anti-lock brake system as claimed in claim 9 wherein the cover defines the second end of the chamber and the spring is disposed thereagainst.

12. An anti-lock brake system as claimed in claim 10 wherein the cover has a plurality of apertures defining a grid reinforcing the membrane.

13. An anti-lock brake system as claimed in claim 12 wherein the membrane is retained against the cover by heat staking it in place.

14. An anti-lock brake system as claimed in claim 12 wherein the membrane is sandwiched within the cover between rigid inner and outer supporting portions of the cover defining a plurality of aligned apertures.

15. An accumulator as claimed in claim 10 wherein the membrane is formed from polytetraflouroethylene.

16. An anti-lock brake system as claimed in claim 9 wherein the semi-permeable structure is a disc formed of open cell thermoplastic material.

* * * * *